United States Patent [19]

Schreiner

[11] Patent Number: 5,397,098

[45] Date of Patent: Mar. 14, 1995

[54] MODULATING VALVE

[75] Inventor: Michael R. Schreiner, Port Washington, Wis.

[73] Assignee: Erie Manufacturing Company, Milwaukee, Wis.

[21] Appl. No.: 922,637

[22] Filed: Jul. 30, 1992

[51] Int. Cl.[6] ............................................. F16K 31/52
[52] U.S. Cl. ..................................... 251/122; 251/260
[58] Field of Search ......................... 251/120, 260, 122

[56] References Cited

U.S. PATENT DOCUMENTS

| 3,426,798 | 2/1969 | Chernak | 251/120 X |
| 3,572,384 | 3/1971 | Taylor | 251/260 X |
| 4,508,142 | 4/1985 | Eburn, Jr. et al. | 251/120 X |

FOREIGN PATENT DOCUMENTS

| 2007336 | 6/1979 | European Pat. Off. . |
| 1040330 | 10/1958 | Germany . |
| 2853719 | 7/1980 | Germany . |
| 8800051 | 2/1988 | Germany . |
| 3640426 | 6/1988 | Germany . |
| 338338 | 6/1959 | Switzerland . |
| 456277 | 7/1968 | Switzerland . |

Primary Examiner—Robert G. Nilson
Attorney, Agent, or Firm—Andrus, Sceales, Starke & Sawall

[57] ABSTRACT

A modulating valve includes an inlet passage and a discharge passage, both of which are in communication with an internal cavity associated with the valve body. An actuator arrangement includes a pivoting actuator shaft, at least a portion of which is located within the internal cavity. A flow-controlling plug member includes a first portion extending into one of the passages, and a second portion located within the internal cavity. The first portion is provided with guide structure engageable with one or more walls defining the passage, to guide axial movement of the plug member. The second portion of the plug member is interconnected with the actuator shaft. The plug member second portion and the actuator shaft are interconnected in such a manner that pivoting movement of the actuator shaft results in axially inward or outward movement of the plug member within the passage. Flow-controlling structure provided on the plug member controls the amount of fluid discharged from the valve, depending on the position of the plug member relative to the passage.

2 Claims, 4 Drawing Sheets

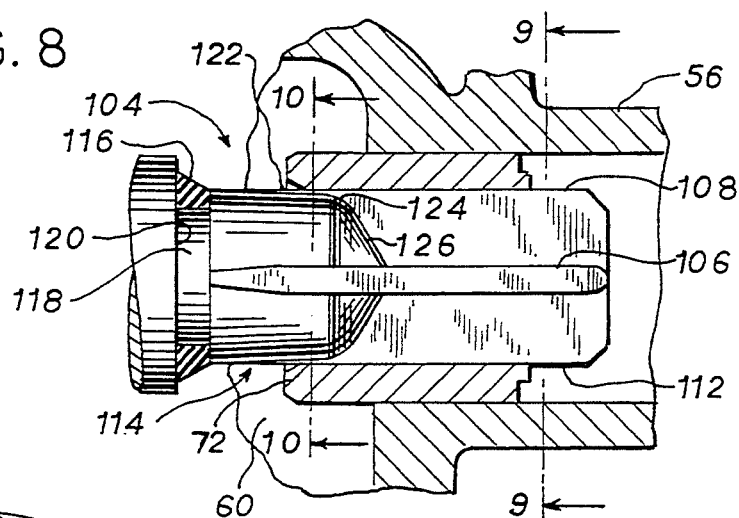
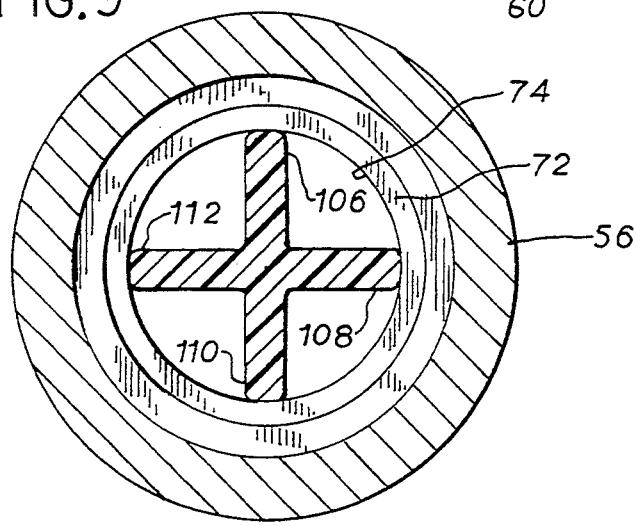
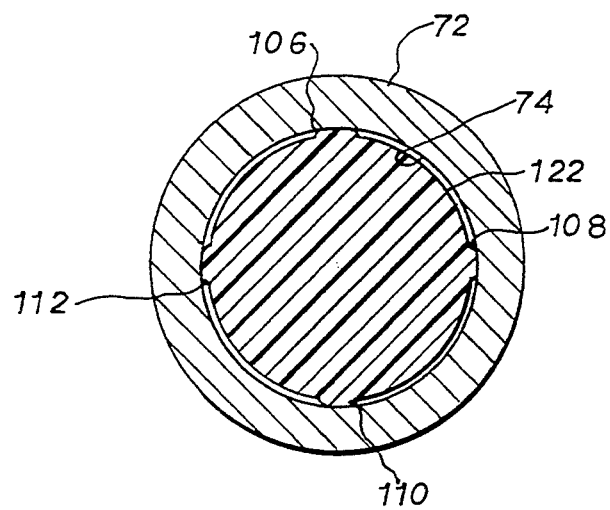
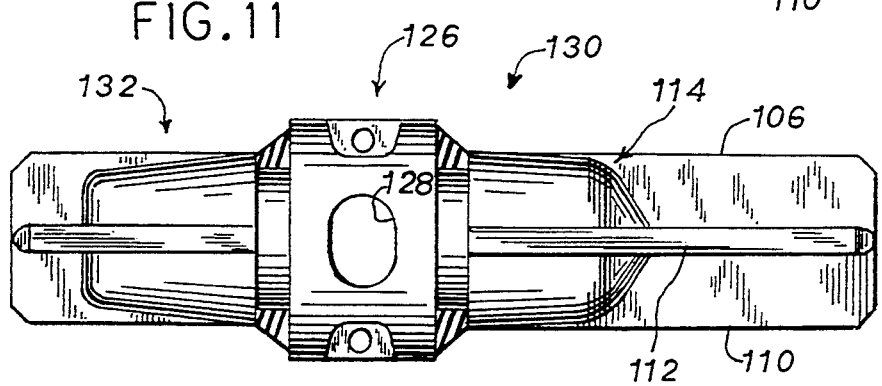

MODULATING VALVE

BACKGROUND AND SUMMARY

This invention pertains to a valve for controlling fluid flow, and more particularly to a modulating valve capable of varying the flow rate of fluid in a fluid system.

In a fluid system, such as a heating and cooling system employing a liquid such as water as the heating or cooling medium, conventional two-position prior art valves for controlling flow of fluid in the system provide either 100% flow of fluid in the system or no fluid flow. With this type of valve, temperature output by the heating or cooling system constantly fluctuates in a small range above and below the set point. Valves of this type are desirable for their low cost as well as for their reliability. Further, the configuration of such valves is known to all manufacturers of heating and cooling systems on an OEM basis, and their construction, configuration and operation are familiar, known quantities.

In recent years, modulating valves have been developed to vary the flow rate of fluid in such fluid systems. With a modulating valve, interfaced with modern electronic controllers, a desired output temperature can be maintained relatively stable.

Modulating valves as developed to date generally employ a plunger, or plug, axially movable into and out of an opening associated with a passage, typically the inlet passage, of the valve. The plug is mounted at one end of a stem. The other end of the stem is interconnected with an external actuator arrangement for providing axial movement of the stem, and thereby movement of the plug, relative to the inlet opening. The shape of the plug and the position of the plug relative to the inlet opening control the amount of fluid flowing through the valve.

Prior art modulating valves of this type are expensive due to close tolerances required in manufacture as well as certain high cost components formed of stainless steel or brass. Further, due to the presence of the actuator arrangement and the axial movement of the stem, with the actuator arrangement being located on the exterior of the valve, the valve configuration differs significantly from the known configuration of prior art two-position valves as described.

It is an object of the present invention to provide a modulating valve which is simple in construction and operation, yet which provides the same overall valve configuration as prior art two-position valves. It is a further object of the invention to provide a modulating valve requiring minimal modifications from prior art two-position valves, in order to reduce the manufacturing cost of the valve and to allow the valve to be incorporated into existing heating and cooling systems with minimal changes to the system.

In accordance with one aspect of the invention, a modulating valve includes a body defining an internal cavity and a pair of openings, one of which defines an inlet to the cavity and the other of which provides an outlet from the cavity. An axial passage, defined by one or more walls, extends from one of the openings, preferably the inlet opening. A plug member has a first portion which extends through the inlet opening and into the axial passage, and a second portion disposed within the internal cavity. The plug member first portion includes guide structure which is engageable with the one or more walls defining the passage. An actuator mechanism is interconnected with the second portion of the plug member for controlling the axial position of the plug member relative to the opening. The guide structure cooperates with the one or more walls defining the passage to guide the axial movement of the plug member upon operation of the actuator mechanism. The actuator mechanism includes a pivotable actuator shaft which extends into the internal cavity, and a connection arrangement which interconnects the actuator shaft and the second portion of the plug member, for providing axial movement of the plug member in response to pivoting movement of the actuator shaft. The connection arrangement is preferably in the form of a slot associated with the plug member second portion, and a pin engaged within the slot. A link extends between and interconnects the actuator shaft and the pin, so as to allow the pin to move laterally within the slot relative to the axis of the passage upon pivoting movement of the actuator shaft. In this manner, the plug member is moved axially within the passage. The plug member first portion includes flow-controlling structure which cooperates with the inlet opening, for varying the flow of fluid through the valve body responsive to the position of the plug member relative to the inlet opening. The guide structure is in the form of one or more ribs provided on the first portion of the plug member, with the ribs extending forwardly of the flow-controlling structure.

The invention further contemplates a method of guiding axial movement of a plug member in a valve, substantially in accordance with the foregoing summary.

In accordance with another aspect of the invention, the inlet opening, the outlet opening, and the axial passage which extends from one of the openings, are in axial alignment. The plug member is mounted for movement within the passage, and includes guide structure as summarized above engageable with the one or more walls defining the passage. The plug member is axially movable along an axis coincident with the longitudinal axis along which the axial passage, the inlet opening and the discharge opening are located. The actuator mechanism extends into the internal cavity defined by the valve body, and is laterally offset from the longitudinal axis along which the plug member is movable.

Various other features, objects and advantages of the invention will be made apparent from the following description taken together with the drawings.

BRIEF DESCRIPTION OF THE DRAWINGS

The drawings illustrate the best mode presently contemplated of carrying out the invention.

In the drawings:

FIG. 8 is an enlarged partial sectional view showing the plug member of the modulating valve of the invention as located in the discharge passage of the valve of FIG. 1;

FIG. 9 is a section view taken along line 9—9 of FIG. 8;

FIG. 10 is a section view taken along line 10—10 of FIG. 8; and

FIG. 11 is an elevation view showing a modified plug member for use in a three-way modulating valve.

DETAILED DESCRIPTION OF THE PRIOR ART

Figure 1:
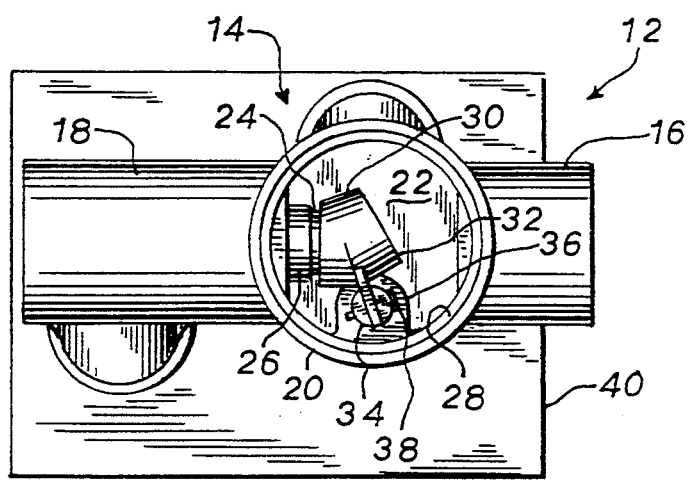
FIG. 1 is a plan view of a prior art two-position valve, with the valve cap removed so as to expose the internal cavity of the valve.

FIG. 1 illustrates a prior art two-position valve 12. Valve 12 includes a valve body 14 defining a discharge nipple 16, an inlet nipple 18, and a housing 20 defining an internal cavity 22. Discharge nipple 16 and inlet nipple 18 each define an axially extending internal passage. The discharge passage defined by discharge nipple 16 communicates directly with housing cavity 22. The inlet passage defined by inlet nipple 18 communicates with internal cavity 22 through a cylindrical sleeve 26, having a stepped-down end portion 24, press-fit into inlet nipple 18.

Valve body housing 20 defines a circular vertical wall 28, which has internal threads adapted to receive an externally threaded cap or the like for normally sealing internal cavity 22 when valve 12 is in use.

Valve 12 further includes a plug 30 located within internal cavity 22. Plug 30 is formed of a resilient material such as hard rubber, molded about a plate 32. Plate 32 extends into a slot formed in a pivoting actuator shaft 34 extending through a mounting boss 36. Plate 32 is fixed to actuator shaft 34 by means of a pin 38.

In a manner as is known, actuator shaft 34 extends exteriorly of valve body 14 and into the interior of a motor and gear housing 40. Motor and gear housing 40, in turn, is interconnected with an electronic controller or the like so as to selectively provide pivoting movement of actuator shaft 34, to move plug 30 between its closed position, as shown in FIG. 1, and an open position. When plug 30 is in its closed position, no flow of fluid is allowed to be discharged to internal cavity 22 from the inlet passage defined by inlet nipple 18. When plug 30 is in its open position, maximum flow of fluid is provided into cavity 22 from the inlet passage defined by inlet nipple 18 and thereby to the discharge passage defined by discharge nipple 16.

DETAILED DESCRIPTION OF THE INVENTION

Figure 2:
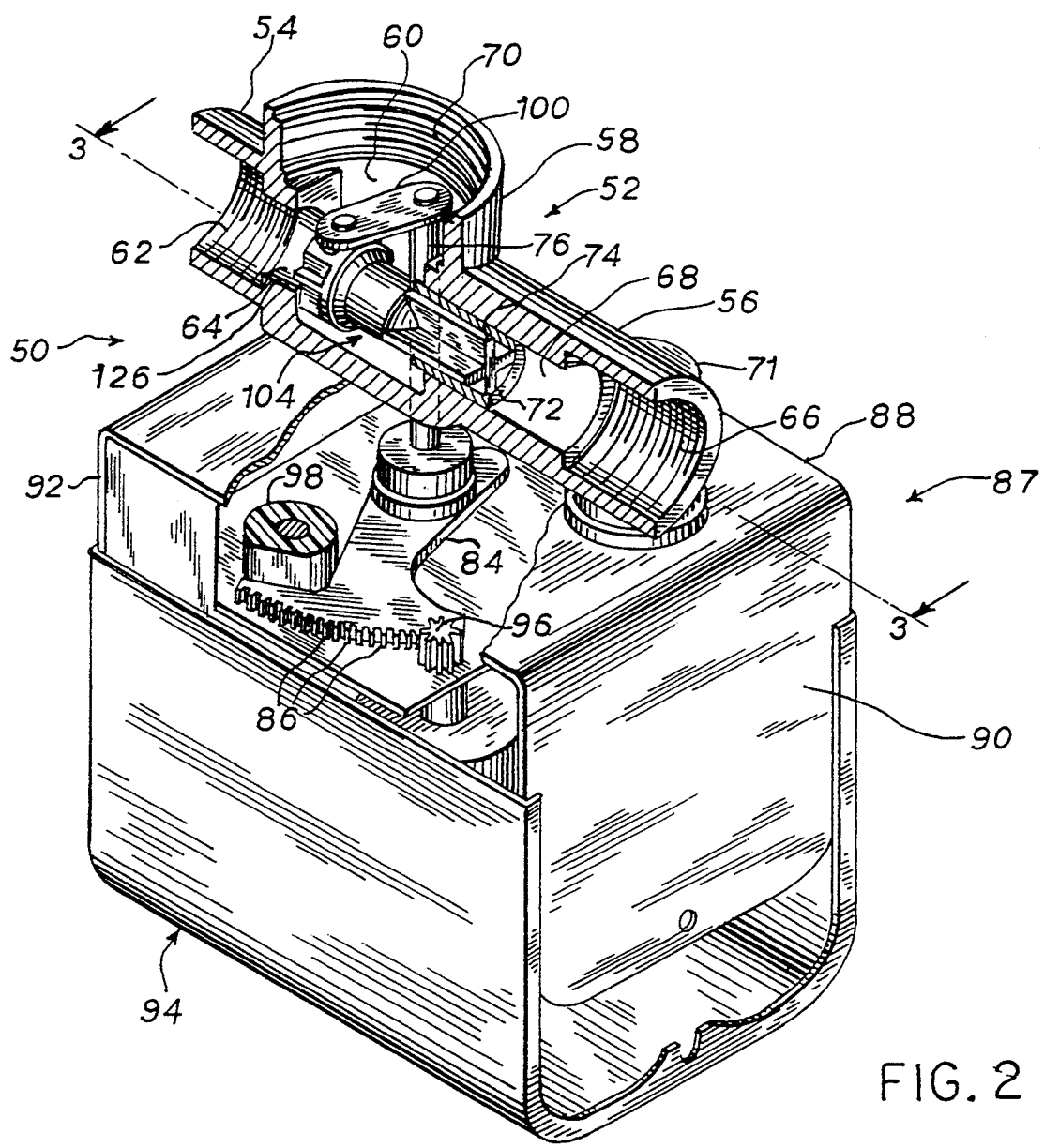
FIG. 2 is an isometric view, with portions broken away and shown in section, showing the modulating valve of the present invention with the valve cap removed.

FIG. 2 illustrates a modulating valve 50 constructed according to the invention. As with prior art valve 12, valve 50 also includes a valve body 52 which includes a discharge nipple 54, an inlet nipple 56, and a housing 58 which defines an internal cavity 60.

Discharge nipple 54 defines an internally threaded passage 62 adapted to receive the external threads of a fitting for discharging fluid from internal cavity 60 through a reduced-diameter discharge passage 64 which terminates in a discharge opening establishing communication between discharge passage 64 and internal cavity 60. Similarly, inlet nipple 56 includes an internally threaded passage 66 for receiving the external threads of a fitting providing flow of fluid to valve 50. An inlet passage 68 extends between threaded passage 66 and internal cavity 60, terminating in an inlet opening which establishes communication between inlet passage 68 and internal cavity 60.

Housing 58 is also provided with an internally threaded passage, shown at 70, for receiving the external threads of a cap member (not shown) adapted to seal internal cavity 60 when valve 50 is in use.

Valve body 52 is preferably constructed of a forged metal material, such as brass. A pair of mounting bosses, one of which is shown at 71, are integrally forged with valve body 52.

Figure 3:
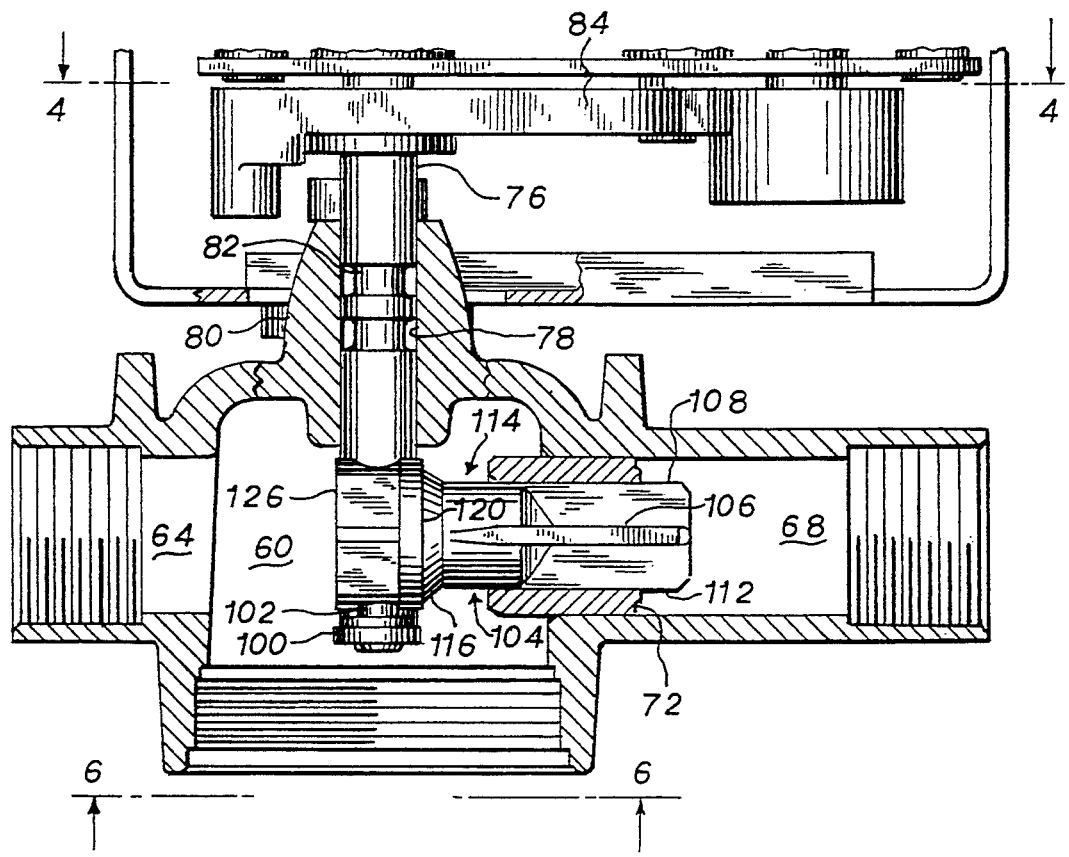
FIG. 3 is a partial section view taken along line 3—3 of FIG. 2.

Referring to FIGS. 2 and 3, a cylindrical sleeve 72 is press-fit into inlet passage 68, defining an internal passage 74 which establishes communication between inlet passage 68 and internal cavity 60.

An actuator shaft 76 (FIGS. 2, 3) extends into internal cavity 60. Actuator shaft 76 extends through a passage 78 formed in a boss 80 defined by valve body 52. In a manner as is known, a fluid-tight seal is provided about actuator shaft 76 by O-rings or the like placed within a pair of grooves, one of which is shown at 82 (FIG. 3), formed on actuator shaft 76.

The exterior end of actuator shaft 76 is fixedly mounted to a segment gear 84 which defines a series of teeth 86. Gear 84 is contained within a housing 87 defined by a plate 88, a pair of sidewalls 90, 92, and a cover 94. Housing 87 defined by components 88–94 contains an electric motor and a gear reduction arrangement, as known in the art, for imparting rotation to a drive gear 96 in either a clockwise or counter-clockwise direction. A stop 98, spaced from drive gear 96, is provided for limiting movement of segment gear 84.

Figure 4:
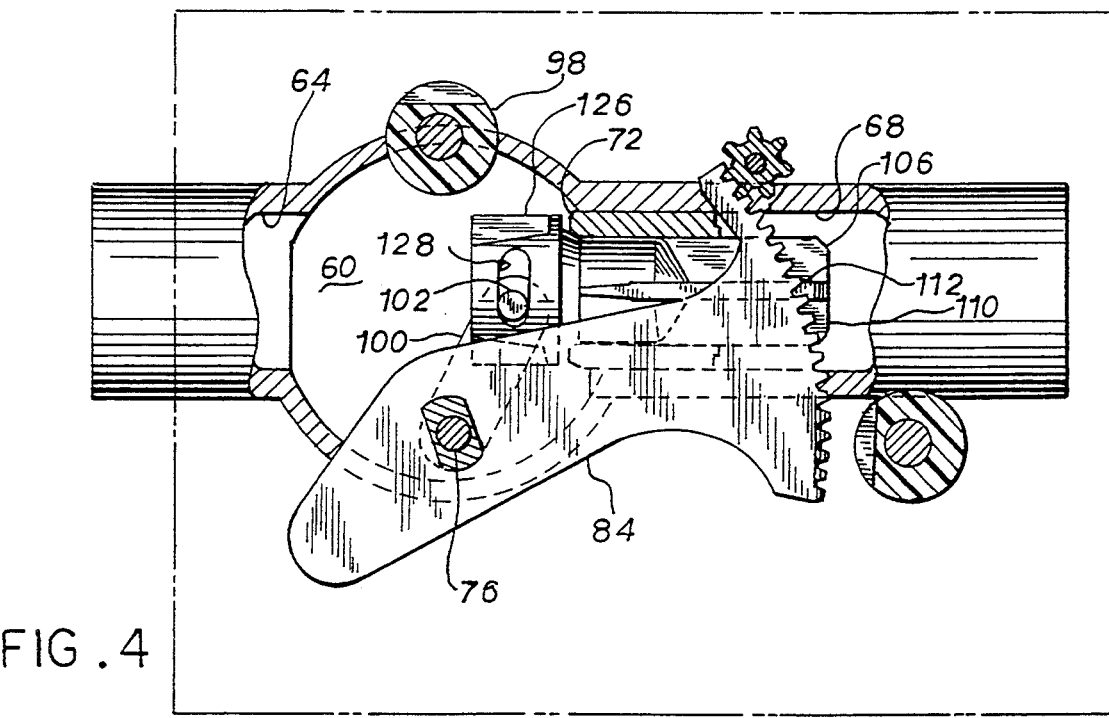
FIG. 4 is a section view taken along line 4—4 of FIG. 3, showing the plug member of the modulating valve of the invention in its closed position.
Figure 5:
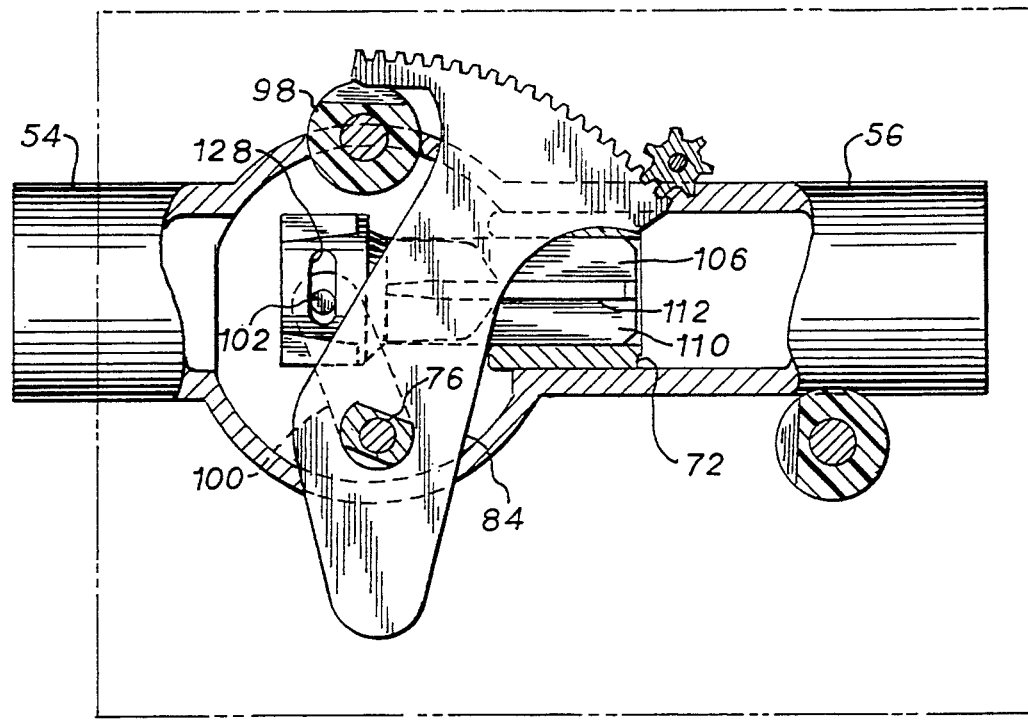
FIG. 5 is a view similar to FIG. 4, showing the plug member in its open position.
Figure 6:
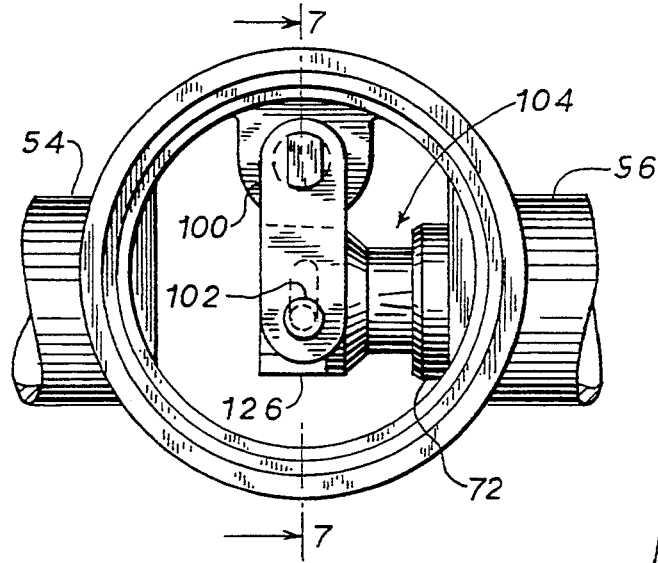
FIG. 6 is a partial plan view showing the actuator mechanism of the modulating valve of the invention, reference being made to line 6—6 of FIG. 3.
Figure 7:
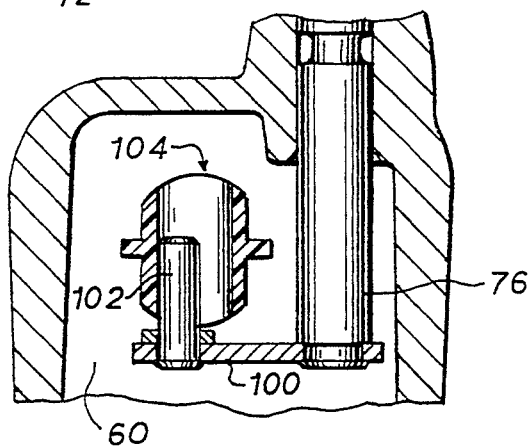
FIG. 7 is a partial section view taken along line 7—7 of FIG. 6.

As shown in FIG. 2, a link 100 is mounted to the inner end of actuator shaft 76. Link 100 interconnects actuator shaft 76 with a pin 102 (FIG. 4).

A plug member 104 is interconnected with pin 102. Plug member 104 includes a first portion which extends into and through passage 74 defined by cylindrical sleeve 72, mounted within inlet passage 68. A second portion of plug member 104 is disposed within internal cavity 60.

As illustrated in FIGS. 3–5, 8 and 9, the first portion of plug member 104 includes ribs 106, 108, 110 and 112. Ribs 106–112 are at right angles to each other, and have a length of approximately 1.5 times the length of cylindrical sleeve 72. Ribs 106–112 extend forwardly from a nose portion 114 of plug member 104.

Ribs 106–112 each define an axially-extending outer end which is engageable with the wall defining passage 74 of cylindrical sleeve 72, to guide axial movement of plug member 104 within passage 74. Ribs 106–112 cooperate with the wall defining sleeve passage 74 to define four equal fluid flow channels through which fluid is discharged from inlet passage 68 into internal cavity 60.

Referring to FIG. 8, nose portion 114 of plug member 104 defines a parabolic surface which cooperates with the discharge opening of cylindrical sleeve 72 to vary the amount of flow through sleeve 72 responsive to the position of plug member 104 relative to the inlet opening of sleeve 72. The parabolic flow-controlling surface terminates rearwardly adjacent a sealing ring 116 placed within a groove 118 adjacent a shoulder 120 of plug member 104. Ribs 106–112 extend forwardly from groove 118. The parabolic flow-controlling surface defined by nose portion 114 includes a gradually sloped surface 122 which merges with a transition surface 124 and a sharply angled surface 126.

In the illustrated embodiment, the parabolic flow-controlling surface defined by nose portion 114 provides a flow curve in which the percentage increase in the rate of fluid flow through valve 50 corresponds to the percentage increase in the degree of openness of valve 50, governed by the position of plug member 104 relative to the inlet opening defined by sleeve 72. Other configurations for plug member nose portion 114 can be provided, such as one in which the flow rate varies linearly with the degree of openness of valve 50. The specific design and construction of the parabolic flow-controlling surface of nose portion 114 is known in the art.

Referring to FIG. 3, the second portion of plug member 104, disposed within cavity 60, consists of a base 126 extending rearwardly from shoulder 120. Base 126 includes a slot 128 (FIG. 4), which receives pin 102 therein. Slot 128 extends along an axis substantially perpendicular to the longitudinal axis of plug member 104, which is coincident with the longitudinal axis of cylindrical sleeve 72, inlet passage 68 and discharge passage 64.

Plug member 104 is preferably injection molded of a plastic material. After molding, sealing ring 116 is mounted to plug member 104 and engaged within groove 118. Alternatively, a sloped shoulder corresponding in shape to sealing ring 116 can be molded integrally with plug member 104.

In operation, valve 50 functions as follows. Typically, a liquid heating or cooling medium, such as water, is supplied to internal cavity 60 through inlet passage 68. When no liquid flow is required or desired, the motor and gear reduction system is actuated in a known manner so as to rotate drive gear 96 in a clockwise direction. This results in pivoting movement of segment gear 84 in a counter-clockwise direction, away from stop 98, and counter-clockwise pivoting of actuator shaft 76 within internal cavity 60. Such rotation of actuator shaft 76 causes counter-clockwise movement of link 100 about a pivot axis defined by the longitudinal axis of actuator shaft 76. Engagement of pin 102 within slot 128 of plug member base 126 results in plug member 104 being moved axially into passage 74 of cylindrical sleeve 72. The engagement of ribs 106–112 with the wall defining passage 74 maintains plug member 104 in axial alignment with passage 74. Pin 102 travels laterally within slot 128 during this push-in motion of plug member 104. Rotation of actuator shaft 76 continues until plug member 104 is moved to its FIG. 4 position, in which sealing ring 116 engages the inlet opening defined by cylindrical sleeve 72, to cut off communication between inlet passage 68 and internal cavity 60. With plug member 104 in this position, fluid is not allowed to pass from inlet passage 68 into internal cavity 60.

When it is desired to provide a limited amount of fluid flow from cavity 60 to discharge passage 64, plug member 104 is moved away from its closed position by counter-clockwise rotation of drive gear 96, which is transferred through segment gear 84 to actuator shaft 76. This results in clockwise movement of link 100, to draw pin 102 rearwardly within cavity 60. This motion of pin 102 draws plug member 104 rearwardly away from the inlet opening defined by cylindrical sleeve 72. When plug member 104 is moved slightly away from the inlet opening defined by sleeve 72, a gap is formed between angled surface 122 of nose portion 114 and the internal wall defining passage 74 of cylindrical sleeve 72. FIG. 10 illustrates plug member 104 in this position. For example, FIG. 10 may illustrate the position of plug member 104 providing twenty percent of the maximum flow of fluid from inlet passage 68. When additional flow is desired, actuator shaft 76 is pivoted yet further clockwise until plug member 104 attains a desired position providing the desired amount of flow from inlet passage 68. When full flow of fluid is desired, plug member 104 is moved to its FIG. 5 position.

At all times during axial movement of plug member 104 within passage 74 of sleeve 72, ribs 104–106 remain in contact with the internal wall defining passage 74 to guide axial movement of plug member 104 therein.

The provision of slot 128 in plug member base 126 allows a conventional pivoting actuator shaft arrangement, as was known in the art in connection with two-position valves, to be adapted to a modulating valve construction. Allowing lateral travel of pin 102 within slot 128, in combination with guiding plug member 104 in sleeve 72 by means of ribs 106–112, results in a unique and efficient construction for adapting a conventional actuator system to a modulating valve application.

The drawings illustrate an arrangement in which a transverse slot is formed in the plug member, within which a pin travels back and forth to provide linear movement of the plug member in response to pivoting movement of the actuator arrangement. It is understood, however, that the invention also contemplates a pin mounted to the plug member, and a linear slot being formed in an actuator member interconnected with the actuator arrangement. The pin on the plug member would then travel back and forth in the slot provided in the actuator member, to translate pivoting movement of the actuator member into linear movement of the plug member.

FIG. 11 illustrates a plug member 130 for use in a three-way valve construction. The same basic concepts as incorporated into plug member 104 are included in the base and forward portion of plug member 130. Plug member 130, however, also includes a rear portion 132 adapted to fit within a third opening associated with valve body 52 and to modulate fluid flow therethrough as described previously. For example, plug member 130 is employed in a mixing valve application in which passages 64, 68 are both inlets, and in which an outlet is formed in the cap member which is threaded into internal threads 70 formed in housing 58. The same actuator arrangement as shown and described is then employed in connection with plug member 130. With this arrangement, the amount of flow of fluid being supplied to cavity 60 from passages 64, 68 is controlled by the position of plug member nose portion 114 relative to the inlet opening, and by the position of the flow-controlling structure provided on the nose portion of rear portion 132 relative to the other inlet opening. In this manner, the proportional amount of fluid supplied to cavity 60 from passages 64, 68 can be closely and accurately controlled. In another application, plug member 130 can be employed in a diverting valve application, in which passages 64, 68 are both outlet passages and in which an inlet passage is formed in the cap member threaded into internal threads 70 of housing 58. Again, the amount of fluid supplied to each of passages 64, 68 is controlled according to the position of the flow controlling structure provided on nose portion 114 and on the rearward portion 132 of plug member 130, to control the amount of fluid passing into passages 64, 68 and discharged from valve 52.

In FIG. 11, the flow-controlling structure provided on nose portion 114 is the same as described previously, in which the percentage of flow corresponds to the degree of openness of the valve. Rearward portion 132, on the other hand, provides a linear flow curve, in which the amount of flow varies linearly according to the degree of openness of the valve.

In the arrangement described above, a fitting analogous to sleeve 72 would be placed within passage 64, to accommodate rearward portion 132 of plug member 130.

While the invention has been described in connection with a heating or cooling system in which liquid, such as water, provides the heating and cooling medium, it is understood that the valve of the invention could be used in any application in which it is desired to variably control the amount of fluid discharged from a valve. Further, it is understood that plug member 104 could be located in either inlet passage 64 or in outlet passage 68 as illustrated in the drawing figures.

Various alternatives and embodiments are contemplated as being within the scope of the following claims, particularly pointing out and distinctly claiming the subject matter regarded as the invention.

I claim:

1. A valve, comprising:

a body defining an internal cavity, a pair of openings in communication with the internal cavity, and an axial passage defined by one or more walls extending from a first one of the openings;

a plug member having a first portion extending through the first opening and into the passage, and a second portion disposed within the internal cavity, wherein the plug member first portion includes guide structure engageable with the one or more walls defining the passage for guiding axial movement of the plug member relative to the passage, and wherein engagement between the guide structure and the one or more walls defining the passage, functions as the sole support of the plug member during axial movement within the passage; and an actuator mechanism interconnected with the second portion of the plug member for controlling the axial position of the plug member relative to the first opening, wherein the guide structure cooperates with the one or more walls defining the passage to guide axial movement of the plug member upon operation of the actuator mechanism, the actuator mechanism comprising a pivotable actuator shaft extending into the internal cavity and a connection arrangement interconnecting the actuator shaft and the plug member second portion for providing axial movement of the plug member in response to pivoting movement of the actuator shaft, wherein the connection arrangement comprises a slot associated with the plug member second portion extending non-parallel to the axis of the passage, a pin engaged within the slot, and a link extending between and interconnecting the actuator shaft and the pin, wherein the pin moves laterally within the slot relative to the axis of the passage upon pivoting movement of the actuator shaft, to provide axial movement of the plug member within the axial passage.

2. The valve of claim 1, wherein the slot extends along an axis substantially transverse to the axis of the passage.

* * * * *